W. A. TURBAYNE.
ELECTRICAL SYSTEM OF REGULATION.
APPLICATION FILED APR. 17, 1911.

1,197,159.

Patented Sept. 5, 1916.

Witnesses:
Robert N. Weir
Geo. B. Jones

Inventor:
William A. Turbayne
By Edwin B. H. Tower Jr.
Atty.

UNITED STATES PATENT OFFICE.

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

ELECTRICAL SYSTEM OF REGULATION.

1,197,159.      Specification of Letters Patent.      Patented Sept. 5, 1916.

Application filed April 17, 1911. Serial No. 621,597.

*To all whom it may concern:*

Be it known that I, WILLIAM A. TURBAYNE, a citizen of the United States, residing at Niagara Falls, in the county of Niagara and State of New York, have invented new and useful Improvements in Electrical Systems of Regulation, of which the following is a full, clear, concise, and exact description, reference being had to the accompanying drawing, forming a part of this specification.

My invention relates to a system of electrical regulation.

One of the objects of the invention is to provide novel means for regulating a generator to confine the output of the generator within predetermined limits.

Another object is to provide improved regulating means which will effect a reduction or tapering of the current supplied to a battery, which is associated with the generator, when the battery approaches a fully charged condition.

A further object of the invention is to provide a novel counter-electro-motive-force device adapted to regulate the generator field strength.

In the accompanying drawings I have illustrated one embodiment of the invention adapted particularly for car lighting service. The invention may of course be embodied in other forms and applied to other uses.

Figure 1:
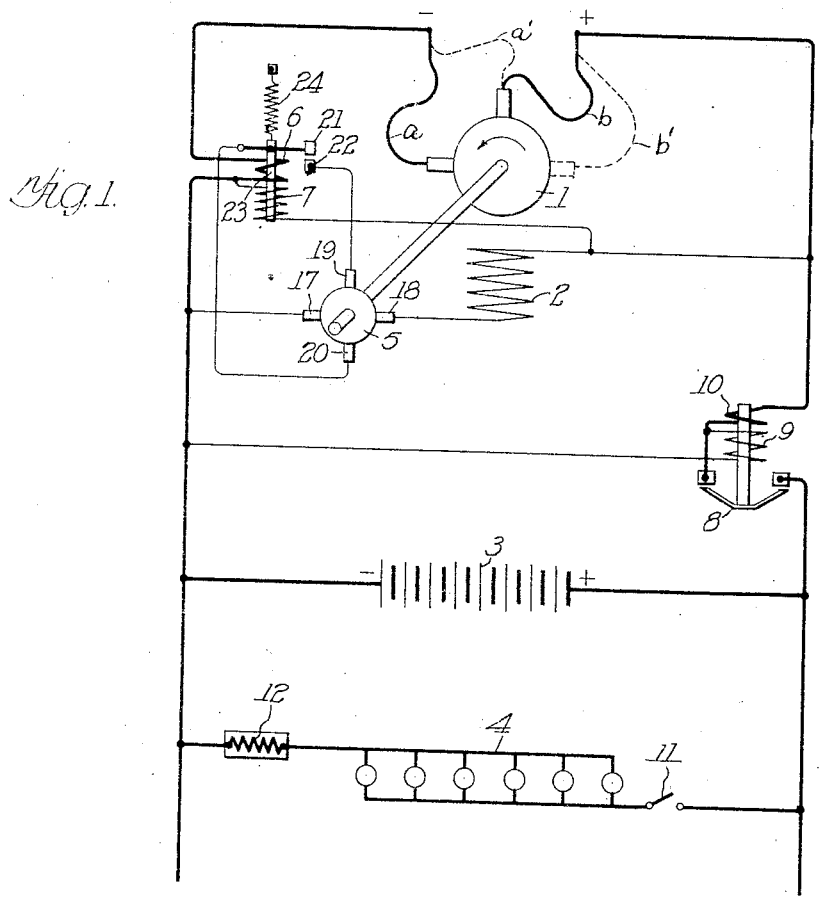
Figure 2:
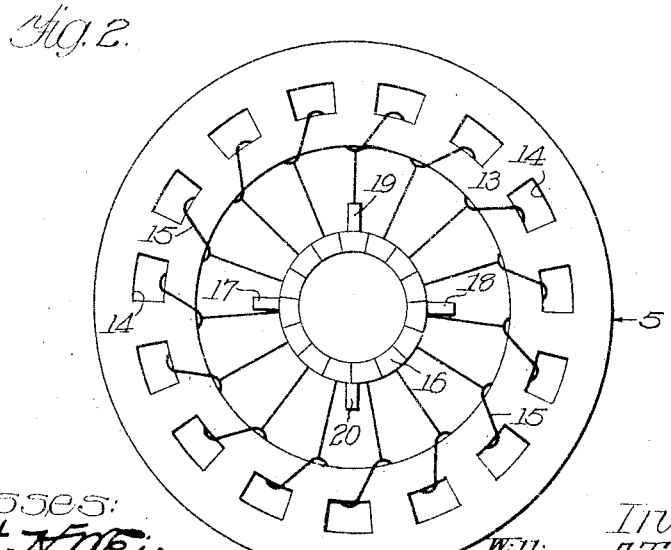

In the drawings: Figure 1 illustrates a car lighting system embodying the invention. Fig. 2 illustrates diagrammatically a preferred construction of counter-electro-motive force device.

The car lighting system illustrated comprises a generator having an armature 1 and a shunt field winding 2 adapted to supply an external circuit across which a storage battery 3 and lamp circuit 4 are connected in parallel branches.

The output of the generator is regulated by the counter-electro-motive-force device 5 which is adapted under certain conditions to oppose the current in the shunt field winding 2 and thereby vary the effectiveness of the same. The operation of the counter-electro-motive force device is controlled by a controlling winding or windings, connected in circuit to give the regulation desired. I have illustrated a current responsive series winding 6 connected in the external circuit and a voltage responsive shunt coil 7 connected across the external circuit. The controlling winding or windings may of course be otherwise connected.

An automatic switch 8 is adapted to close the external circuit from the generator to the storage battery upon predetermined voltage rise of the generator. The automatic switch comprises a shunt connected lifting coil 9 and a series connected releasing coil 10. The circuit to the lamps may be closed by any suitable type of switch 11 and the voltage impressed on the lamp circuit may be controlled by any suitable form of regulator 12.

The counter-electro-motive force device illustrated in Fig. 2 consists preferably of a laminated iron cylinder 13, having openings 14 therethrough, provided with a distributed winding 15 of the usual type, connected to a commutator 16 at regular intervals. The iron ring surrounding the openings 14 need not necessarily be integral with and rotated with the cylinder 13, as this ring simply completes the magnetic circuit for the flux set up in the interior portion surrounded by the windings 15. The use of a ring of integral construction, however, is accompanied by certain gains incidental to the elimination of the air-gap.

Four brushes engage the commutator 16, the brushes 17, 18 being connected in the circuit with the main field winding 2 of the generator and the brushes 19, 20, which are preferably arranged ninety electrical degrees from said first brushes being connected with the make and break contacts 21, 22 which may be arranged and mounted in any suitable manner. The ring 13 is attached to the armature shaft of the generator and rotates therewith. The movable contact 21 is adapted to be operated by the movements of the core 23 in response to the energization of the windings 6 and 7. This core is normally held in uppermost position by the spring 24, whereby the short circuit around the brushes 19, 20 is normally open at the contacts 21, 22.

The operation of the system is substantially as follows. Upon starting rotation, the main generator will operate as an ordinary shunt machine until when sufficient speed and voltage have been attained, the energization of the lifting coil 9 will cause the closing of the automatic switch 8, whereupon the generator will charge the storage battery and carry the lamp load, if the lamp circuit is closed. The closing of the automatic switch takes place when the generator voltage is slightly in excess of the battery voltage. The flow of generator current through the releasing coil 10, causes said coil to aid the lifting coil 9 in holding the automatic switch closed. If the generator voltage should drop below the battery voltage, the flow of battery current through said releasing coil 10 in reverse direction, would cause said releasing coil 10 to oppose the lifting coil 9, whereupon the automatic switch would fall open, disconnecting the generator from the battery. During the operation of the generator, the current through the field winding 2 will also traverse the windings 15 of the counter-electromotive force device 5, thereby setting up a magnetic flux in line with the brushes 17 and 18. Rotation through this flux will develop maximum voltage across the brushes 19 and 20 but will develop negligible voltage across the brushes 17 and 18 included in the generator field circuit. If the generator current or voltage tends to exceed the value for which the contact 21 is adjusted to operate, the core 23 will be drawn down, thereby establishing a short circuit across the brushes 19 and 20, and the current in this short circuit will set up an effective magnetic flux having an axis in line with the brushes 19 and 20, so that a counter-electro-motive force will then be developed across brushes 17 and 18 in opposition to that impressed by the generator across the field winding 2. This counter-electro-motive force will therefore cause a reduction of the generator field strength and consequently generator output, whereby the core 23 will be again raised by the spring 24 and the contact 21 will also be lifted to open the short circuit across the brushes 19 and 20 and thereby permit the generator output to rise. This cycle of operation will be repeated periodically at a rapid rate and hence the generator output will be held to the desired value, regardless of the speed of rotation. Since the series and shunt coils 6 and 7 respectively, act cumulatively on the core 23, a tapering charge will be given to the battery as the back pressure of the latter rises, the regulating effect of the series coil 6 diminishing as the regulating effect of the shunt coil 7 increases in response to said back pressure increase. It is obvious that any desired output characteristic may be given the generator by providing the proper controlling winding or windings. Furthermore, the limiting values of the generator voltage or current will be determined by the values given to said shunt and series windings respectively. Inasmuch as the generator, when used with a car lighting system, is subject to rotation in either direction, suitable means must be provided for maintaining correct polarity of the generator brushes to insure proper charging of the storage battery. In Fig. 1 the brush-shifting method is illustrated diagrammatically. The positions which the brushes will occupy when the generator is rotating in the direction indicated by the arrow are illustrated in full lines and the flexible connections between the brushes and the main leads are illustrated at $a$ and $b$. Should the armature be rotated in the opposite direction the brushes will automatically shift to the dotted line positions, the flexible connectors for this position being illustrated at $a'$ and $b'$. With the proper polarity of the main generator assured, no pole changing device will be necessary with the counter-electromotive force device 5, as the direction of the magnetic flux set up by short-circuiting the brushes 19 and 20 will always insure the development of a counter-electro-motive force across the brushes 17 and 18 in the proper direction, regardless of the direction of rotation.

I do not desire to limit myself to the details described in connection with the above embodiment of my invention, as it is apparent that various changes may be made without departing from the spirit and scope thereof. I desire, therefore, to cover any suitable equivalent means for accomplishing the desired results and falling within the scope of the appended claims.

I claim as my invention,

1. In a car lighting system, in combination, a shunt wound generator, a counter-electro-motive force device having main brushes connected in series with the shunt field of said generator, a pair of auxiliary brushes for said device off-set 90 electrical degrees from the main brushes thereof, and means for causing a short circuit across said auxiliary brushes whereby a magnetic flux is developed in a direction to cause a counter-electro-motive force in said shunt field circuit said means controlling said short circuit to regulate the generator output.

2. In a car lighting system, in combination, a shunt wound generator, a counter-electro-motive force device having main brushes connected in series with the shunt field of said generator, a pair of auxiliary brushes for said device off-set 90 electrical degrees from the main brushes thereof, means for closing a short circuit across said auxiliary brushes whereby a magnetic flux is developed in line therewith for causing a counter-electro-motive force in said shunt field circuit and additional means for controlling said short circuit to regulate the generator output, said means including a series coil responsive to generator current and a shunt coil responsive to generator voltage, said coils acting cumulatively.

3. In a car lighting system, in combination, a shunt wound generator, a counter-electro-motive force device having main brushes connected in series with the shunt field of said generator, a pair of auxiliary brushes for said device off-set 90 electrical degrees from the main brushes thereof, means for closing a short circuit across said auxiliary brushes whereby a magnetic flux is developed in line therewith for causing a counter-electro-motive force in said shunt field circuit and means for controlling said short circuit to regulate the generator output, said means including a series winding in the external circuit, responsive to variations in generator current.

4. In a car lighting system, in combination, a shunt wound generator, a counter-electro-motive force device having main brushes connected in series with the shunt field of said generator, a pair of auxiliary brushes for said device off-set 90 electrical degrees from the main brushes thereof, means for closing a short circuit across said auxiliary brushes whereby a magnetic flux is developed in line therewith for causing a counter-electro-motive force in said shunt field circuit and means for controlling said short circuit to regulate the generator output, said means including a potential winding connected across the generator terminals and responsive to variations in generator voltage.

5. In a car lighting system, in combination, a shunt wound generator, a counter-electro-motive force device having main brushes connected in series with the shunt field of said generator, a pair of auxiliary brushes for said device off-set 90 electrical degrees from the main brushes thereof, means for closing a short circuit across said auxiliary brushes whereby a magnetic flux is developed in line therewith for causing a counter-electro-motive force in said shunt field circuit and means for controlling said short circuit to regulate the generator output, said means including a current responsive coil and a voltage responsive coil, said voltage responsive coil tending to regulate the generator voltage, and said current responsive coil acting to modify the action of said voltage responsive coil in response to current variations in the external circuit.

6. Regulating means for a shunt wound generator including a counter electro-motive force device, said device having brushes, said device normally developing a magnetic flux in line with the axis of said brushes, whereby substantially no voltage is developed across said brushes, and means whereby a magnetic flux may be developed in said device in a direction to produce an electro-motive force across said brushes.

7. Regulating means for a shunt wound generator including a counter electro-motive force device, said device having brushes, said device normally developing a magnetic flux in line with the axis of said brushes, whereby substantially no voltage is developed across said brushes, and means whereby a magnetic flux may be developed in said device in a direction to produce an electro-motive force across said brushes, said means including a vibrating short-circuiting member, and electro-magnetic means for controlling said member.

8. In combination, a shunt wound generator and regulating means therefor including a counter electro-motive force device, said device having brushes adapted to be connected in series with the shunt field winding of said generator, said device normally developing a magnetic flux in line with the axis of said brushes, whereby substantially no voltage is developed across said brushes, and means whereby a magnetic flux may be developed in said device in a direction to produce a counter-electro-motive force in the generator field circuit, said means including a vibrating short-circuiting member, a current responsive coil and a voltage responsive coil acting cumulatively to control said vibrations.

9. In combination, a shunt wound generator and regulating means therefor, said regulating means including a dynamo electric machine having brushes connected in series with the field winding of said generator, auxiliary brushes electrically displaced from said first brushes, and means for alternately opening and closing a short circuit across said auxiliary brushes, whereby said dynamo electric machine may be caused alternately to produce substantially no effect on the energization of said field winding and to develop a counter electro-motive force tending to decrease the energization of said field winding.

10. In combination, a shunt wound generator and regulating means therefor including a counter electro-motive force device, said device having brushes adapted to be connected in series with the shunt field winding of said generator, said device normally developing a magnetic flux in line with the axis of said brushes, whereby substantially no voltage is developed across said brushes, and means whereby a magnetic flux may be developed in said device in a direction to produce a counter electro-motive force in the generator field circuit.

11. In combination, a shunt wound generator and regulating means therefor including a counter electro-motive force device, said device having brushes adapted to be connected in series with the shunt field winding of said generator, said device normally developing a magnetic flux in line with the axis of said brushes, whereby substantially no voltage is developed across said brushes, and means whereby a magnetic flux may be developed in said device in a direction to produce a counter electro-motive force in the generator field circuit, said means including a vibrating short-circuiting member and electro-magnetic means for controlling said member.

In witness whereof, I have hereunto subscribed my name in the presence of two witnesses.

WILLIAM A. TURBAYNE.

Witnesses:
GEO. B. JONES,
MAX M. OPPENHEIM.